3,054,658
THERMALLY STABILIZED SODIUM HYDROSULFITE COMPOSITIONS

Richard Crawford Franklin, Wilmington, Del., and Harvey Irvin Stryker, Carney's Point, N.J., assignors to E. I. du Pont de Nemours and Company, Wilmington, Del., a corporation of Delaware
No Drawing. Filed Dec. 7, 1959, Ser. No. 857,485
10 Claims. (Cl. 23—116)

This invention is directed to stabilized sodium hydrosulfite ($Na_2S_2O_4$) or, more particularly, to a mixture of sodium hydrosulfite and a minor amount of the sodium salt of a carboxylic acid of the group consisting of an alkanoic acid containing 1 to 18 carbon atoms or of a benzoic acid, said mixture being characterized by stability in storage to spontaneous thermal decomposition.

Under normal storage conditions, commercial grades of sodium hydrosulfite, hereinafter referred to as hydrosulfite, can safely be held without appreciable decomposition for periods of two years or longer, if kept dry. A number of instances, however, have been reported where hydrosulfite in storage has spontaneously caught fire, resulting in heavy damage and loss in some cases. In such fires, large volumes of sulfurous gases are evolved; these fires are very difficult to extinguish. It is thus clear that a potential hazard exists for the manufacturer, shipper and user of ordinary hydrosulfite when it is handled and stored in large quantities.

It is well known that fires can be caused by contact of hydrosulfite with water. When water comes into contact with hydrosulfite, heat is liberated. In large quantities of hydrosulfite in confined places, such as stored drums or storage bins, sufficient temperatures can be reached, from even small amounts of water, to start a decomposition reaction. If allowed to proceed, self-ignition of the decomposition products occurs. When the hydrosulfite is confined in a gas-tight space, such as a drum, the internal pressure generated by the decomposition may be released with explosive violence. As described in the accompanying examples, hydrosulfite decompositions were started in 56 to 200 minutes by adding 3% of water onto the surface of the hydrosulfite at room temperature in an insulated container; and, in one to two minutes by adding 0.7% of water onto the surface of hydrosulfite held at 133° C. Although precautions may be taken to exclude moisture, moisture from the air, residual moisture from incomplete drying of the product when manufactured or water from accidental wetting of the material may be sufficient to initiate a decomposition.

Hydrosulfite decomposition and fires are also caused, without water contact, by heating to temperatures of 135–190° C. (Van O. von Deines and G. Elstner, Ztschr. anorg. Chem. 191, 340 (1930); K. Gaertner, Chem. Ztg. 63, 237 (1939)). A rapid, exothermic reaction is described in these references in which large volumes of sulfur dioxide gas are evolved. This reaction is believed to be similar to decompositions of hydrosulfite resulting from water initiation.

The effect of applicants' carboxylate salts in stabilizing hydrosulfite against thermal decomposition, particularly in the presence of moisture, was not only unobvious, but was also quite unexpected. Although the mechanism by which they function to stabilize hydrosulfite is not clearly understood, the sodium (or potassium) salts of the weak carboxylic acids do not appear to owe their utility as hydrosulfite stabilizers entirely to their basic character or acid-accepting property. Such basic inorganic salts as anhydrous phosphates, anhydrous sodium carbonate, and sodium borates, which are commonly used to stabilize hydrosulfite, have only a small and inadequate effect. Anhydrous sodium carbonate, is normally added to hydrosulfite when it is manufactured to improve storage stability and to remove odorous sulfur dioxide that may be evolved, but does not prevent thermal decomposition.

For example, hydrosulfite containing 20% anhydrous sodium carbonate when heated to 133° C. under the conditions of Example 1 which follows, decomposed even before the addition of water to the mixture, while hydrosulfite containing 5% anhydrous trisodium phosphate decomposed in 10 minutes. Hydrosulfite with 20% anhydrous sodium tripolyphosphate decomposed in 4 minutes, and hydrosulfite with 20% sodium tetraborate decomposed gradually over a 20-minute period.

It is an object of the present invention to provide sodium hydrosulfite that is resistant to thermal decomposition, particularly in the presence of moisture. Another object is to provide a sodium hydrosulfite composition free from the hazards of decomposition and burning in storage. These objects are attained by mixing with sodium hydrosulfite, as a step in its manufacture, for example, a small amount of sodium benzoate or sodium acetate; sodium hydrosulfite so treated resists decomposition even in the presence of moisture and can be stored with high assurance of safety and freedom from explosion and fire hazards.

These and other objects will become apparent in the following description and claims.

More specifically, the present invention is directed to sodium hydrosulfite mixed with about 0.1% to about 45% by weight of the sodium or potassium salt of a carboxylic acid of the group consisting of an alkanoic acid of 1 to 18 carbon atoms and a benzoic acid, said hydrosulfite-salt mixture being characterized by stability against spontaneous thermal decomposition. The benzoic acid may be substituted in the ring by an amino, hydroxy, or methyl group.

The sodium hydrosulfite may be mixed with one or more anhydrous inorganic sodium or potassium salts and about 0.1% to about 45% by weight of the hydrosulfite of the sodium salt of a carboxylic acid as heretofore described. Such anhydrous inorganic salts that may be mixed with hydrosulfite are sodium chloride, sodium sulfate, sodium phosphate, particularly sodium polyphosphate as disclosed in U.S. 2,707,144 in combination with hydrosulfite to enhance the bleaching effect of the hydrosulfite on ground wood pulp. A sodium polyphosphate commonly used for this purpose is sodium tripolyphosphate represented by $Na_5P_3O_{10}$. Potassium tripolyphosphate may be similarly used.

The sodium tripolyphosphate is used in amounts of from about 2 parts to about 100 parts per 100 parts of sodium hydrosulfite; and, preferably in amounts of from about 10 parts to about 65 parts per 100 parts of sodium hydrosulfite. Preferred concentrations of stabilizing salts are from about 0.1% to 10% sodium benzoate and from about 0.5% to 10% sodium acetate.

The sodium hydrosulfite that composes the stable mixture of the present invention is the ordinary commercial grade of material in dehydrated form represented by the formula $Na_2S_2O_4$. Material of varying purity that results from various processes of manufacture or from uncontrolled variations in a given process, as well as chemically pure material, is effectively stabilized according to this invention. Mixtures of hydrosulfite and anhydrous inorganic salts are also stabilized by the sodium salt of a carboxylic acid as heretofore described.

The stabilizers of the present invention comprise the anhydrous sodium (or potassium) salt of the alkanoic acids having from 1 to 18 carbon atoms and of benzoic acid. The benzoic acid may have such ring-substituent as an amino, hydroxy, or methyl group. The alkanoic acids whose neutral sodium or potassium salt may be employed in hydrosulfite mixtures to effect stabilization against decomposition range from formic acid to stearic acid. Besides the unsubstituted benzoic acid, one may use for the preparation of stabilizing salts such substituted acids as p-aminobenzoic, salicylic (o-hydroxy benzoic), and o-, m- and p-toluic acid (o-, m- and p-methylbenzoic). The preferred stabilizing salts are sodium benzoate and sodium acetate in the physical form of fine crystals, powder or flakes.

From about 0.1% to about 45% of a stabilizing salt based upon the weight of the sodium hydrosulfite to be stabilized is employed. The preferred concentration range range varies with the salt selected for use as a stabilizer; it is 0.5% to 1% when sodium benzoate is used and 2.5% to 5% when sodium acetate is employed.

The hydrosulfite is mixed with the stabilizing salt in any way that is convenient; the method employed for mixing the ingredients of a stable hydrosulfite composition is not critical. A simple and usual procedure is to mix the dry solids in a rotating blender. The blending may be done with separate batches of material, or it may be done by feeding continuously the hydrosulfite and the stabilizing salt to be mixed with it in the proper proportions to one end of an elongated rotation blender and continuously withdrawing the mixture from the other end. When a salt other than the stabilizing salt forms a third component of the final mixture, the three components may be mixed at one time or any two of the components may be mixed before adding the third component.

The stabilizing salt may also be added to and mixed with the hydrosulfite while the hydrosulfite is in a wet condition just after it is salted out of solution or at any stage of the subsequent drying operation. Less desirable than dry or wet blending, but possible, is the addition of the stabilizing salt to a solution of the hydrosulfite. In the hydrosulfite salted from solution enough of the stabilizing salt will be retained to provide stability against decomposition.

In the following representative examples, a sensitive, accelerated laboratory test is used to measure the stability of hydrosulfite and to determine and demonstrate the stabilizing effect of a sodium or potassium salt of a carboxylic acid. In the test a 70-g. sample of dry sodium hydrosulfite is placed in a 120 ml. (3.5 cm. I.D. x 12.5 cm. in length) Pyrex brand tube, and the tube with its contents is inserted into an oil bath held at 133±3° C. After 15 minutes when the hydrosulfite has been heated to the bath temperature, 0.5 ml. of water is pipetted onto the surface of the sample, and the time noted. The sample is observed closely for the start of a vigorous evolution of heavy, yellow sulfurous vapors, and the time of such a beginning of decomposition recorded. Differences in the time of the onset of decomposition under these conditions are taken as a measure of the stability of the different samples of hydrosulfite.

EXAMPLE 1

Commercial grade sodium hydrosulfite and 1% (except where otherwise stated) of various sodium and potassium salts of carboxylic acids were mixed by rolling the dry solids in a wide mouth jar. The resulting mixtures were tested for stability by the test heretofore described. The actual salts mixed with the hydrosulfite and the test results in terms of the time in minutes for decomposition to set in are—

| Added agent, 1% by weight: | Time for start of decomposition in minutes |
|---|---|
| None, control | 1.5 |
| Sodium acetate | >60 |
| Potassium acetate | 14 |
| Potassium acetate, 2% | >60 |
| Sodium benzoate | >60 |
| Sodium butyrate | >60 |
| Sodium formate, 5% | 6 |
| Sodium formate, 20% | >60 |
| Sodium propionate | >60 |
| Sodium salicylate | >60 |
| Sodium stearate | >60 |
| Sodium-p-aminobenzoate | >60 |
| Sodium-o-toluate | >60 |

The marked delay in the decomposition of the hydrosulfite in the presence of a carboxylate indicates a strong stabilizing action by which the hydrosulfite would be kept intact and free from the losses and dangers of decomposition for prolonged periods under normal storage conditions.

Hydrosulfite mixtures containing 1%, respectively, sodium benzoate and sodium butyrate were also held at 133° C. for 8 hours after the addition of water without any observed decomposition.

EXAMPLE 2

Mixtures were prepared and tested as in Example 1 employing varying concentrations of sodium acetate and sodium benzoate. The actual concentrations used and the test results are:

| Agent | Conc., Percent by wt. | Start of Decomposition Time in Minutes |
|---|---|---|
| None, control | | 1 |
| Sodium acetate | 0.5 | 6 |
| | 1.0 | >60 |
| | 20.0 | >60 |
| Sodium benzoate | 0.06 | >60 |
| | 0.25 | >60 |
| | 1.0 | >60 |

EXAMPLE 3

*Effect of Stabilizing Salts in Mixtures of Hydrosulfite and Other Salts*

Mixtures were prepared and tested as in Example 1 employing varying concentrations of sodium acetate in mixtures of sodium hydrosulfite, sodium tripolyphosphate ($Na_5P_3O_{10}$), and sodium chloride and employing two concentrations of sodium benzoate in mixtures of hydrosulfite and tripolyphosphate. The compositions of the mixtures and the test results are:

COMPOSITION OF HYDROSULFITE MIXTURE
[All parts by wt.]

| Sodium Hydrosulfite | Sodium Tripolyphosphate | Sodium Chloride | Sodium Acetate | Start of Decomposition time in Minutes |
|---|---|---|---|---|
| 75 | 20 | 5.0 | None | 1 |
| 75 | 20 | 4.5 | 0.5 | 9 |
| 75 | 20 | 4.0 | 1.0 | >120 |
| 75 | 20 | 3.0 | 2.0 | [1] >60 |
| 75 | 20 | 0.0 | 5.0 | [1] >60 |
| | | | Sodium Benzoate | |
| 75 | 25 | | None | 1 |
| 75 | 24.75 | | 0.25 | >60 |
| 75 | 20.0 | | 5.0 | >60 |

[1] Test discontinued after 60 minutes.

The presence of sodium tripolyphosphate in substantial amounts and of sodium chloride in minor amounts has had no observed effect on the decomposition or the stabilization by sodium acetate of the hydrosulfite. Sodium benzoate in the concentration of 0.25 part per 75 parts of sodium hydrosulfite has markedly stabilized the mixture of hydrosulfite and polyphosphate.

EXAMPLE 4

A larger scale test in which decompositions were initiated by water addition at room temperature was used to demonstrate the stability of hydrosulfite mixtures under conditions which simulate actual use or storage. A 7.5 lb. quantity of sample to be tested was placed in a one-gallon, tin-plated, steel can. The can was placed in a 5-gallon container, and the space between the can and the larger container was closely packed with fiber-glass insulation. Heat losses were thus minimized to simulate conditions which would exist in a large container of hydrosulfite. Thermometers were inserted in the hydrosulfite. A volume of 100 ml. of water was added to the surface of the sample at room temperature, and the sample was then allowed to stand undisturbed.

Using unstabilized commercial grade hydrosulfite, temperature rises were observed after the water addition. In five of seven samples tested, the temperature reached 90° to 110° C. in 50 to 200 minutes at which point heavy sulfur dioxide and sulfur fumes were evolved, and the temperature continued to rise rapidly so that in another 15 to 30 minutes temperatures of 200° to 250° C. were reached. Almost complete decomposition of the hydrosulfite took place. In the other two tests there was no evidence of a strong exothermic decomposition.

Mixtures containing 75 parts of commercial grade hydrosulfite, 0.5 part of sodium benzoate, and 24.5 parts of sodium tripolyphosphate were subjected to this same test. In six trials, maximum temperatures of 48° to 64° C. were obtained. After 24 hours the temperature of the material was decreasing, and most of the hydrosulfite remained intact.

Mixtures containing 75 parts of commercial grade hydrosulfite, 2.5 parts of sodium acetate (anhydrous) and 22.5 parts of sodium tripolyphosphate were also tested as described above. In three trials, maximum temperatures of 50–64° C. were obtained, but there was no heavy gas evolution, and most of the hydrosulfite remained in an undecomposed state.

In the preceding examples, any one of the described sodium or potassium carboxylic acid salts may be substituted to give substantial the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A sodium hydrosulfite composition stabilized against spontaneous thermal decomposition by mixing with said sodium hydrosulfite from about 0.1% to about 45% by weight thereof of a salt selected from the group consisting of sodium and potassium salts of a carboxylic acid, said carboxylic acid being selected from the group consisting of an alkanoic acid of 1 to 10 carbon atoms and a benzoic acid.

2. The composition of claim 1 wherein the stabilizing salt is sodium benzoate present in an amount from about 0.1% to 10% by weight of said sodium hydrosulfite.

3. The composition of claim 1 wherein the stabilizing salt is sodium acetate present in an amount from about 0.5% to 10% by weight of said sodium hydrosulfite.

4. The composition of claim 1 mixed with anhydrous inorganic salts selected from the group consisting of sodium and potassium salts.

5. The composition of claim 4 wherein the stabilizing salt is sodium benzoate present in an amount from about 0.1% to 10% by weight of said sodium hydrosulfite.

6. The composition of claim 4 wherein the stabilizing salt is sodium acetate present in an amount from about 0.5% to 10% by weight of said sodium hydrosulfite.

7. The composition of claim 4 mixed with from about 2 to about 100 parts, per 100 parts of sodium hydrosulfite, of sodium tripolyphosphate.

8. The composition of claim 7 wherein the stabilizing salt is sodium benzoate present in an amount from about 0.1% to 10% by weight of said sodium hydrosulfite.

9. The composition of claim 7 wherein the stabilizing salt is sodium acetate present in an amount from about 0.5% to 10% by weight of said sodium hydrosulfite.

10. The composition of claim 7 wherein said sodium tripolyphosphate is present in an amount of from about 10 to 65 parts per 100 parts of sodium hydrosulfite.

References Cited in the file of this patent

UNITED STATES PATENTS

| | | |
|---|---|---|
| 861,218 | Majert | July 23, 1907 |
| 1,810,663 | Kritchevsky et al. | June 16, 1931 |
| 2,121,397 | Downing et al. | June 21, 1938 |

OTHER REFERENCES

Thorpe's Dictionary of Applied Chemistry, 4th ed., vol. 1, 1937, Longmans, Green and Co., New York, page 679. (Copy in Sci. Lib.)

UNITED STATES PATENT OFFICE
CERTIFICATE OF CORRECTION

Patent No. 3,054,658                September 18, 1962

Richard Crawford Franklin et al.

It is hereby certified that error appears in the above numbered patent requiring correction and that the said Letters Patent should read as corrected below.

Column 3, line 26, after "range", first occurrence, insert -- is about 0.5% to about 10%. The specific, preferred concentration --; same column, line 37, for "rotation" read -- rotating --.

Signed and sealed this 26th day of February 1963.

(SEAL)
Attest:

ESTON G. JOHNSON
Attesting Officer

DAVID L. LADD
Commissioner of Patents